J. A. WOODS.
FRUIT GRADER.
APPLICATION FILED FEB. 19, 1913.

1,118,834.

Patented Nov. 24, 1914.

4 SHEETS—SHEET 1.

Witnesses
F. C. Gibson.

Inventor
James A. Woods.
By Victor J. Evans
Attorney

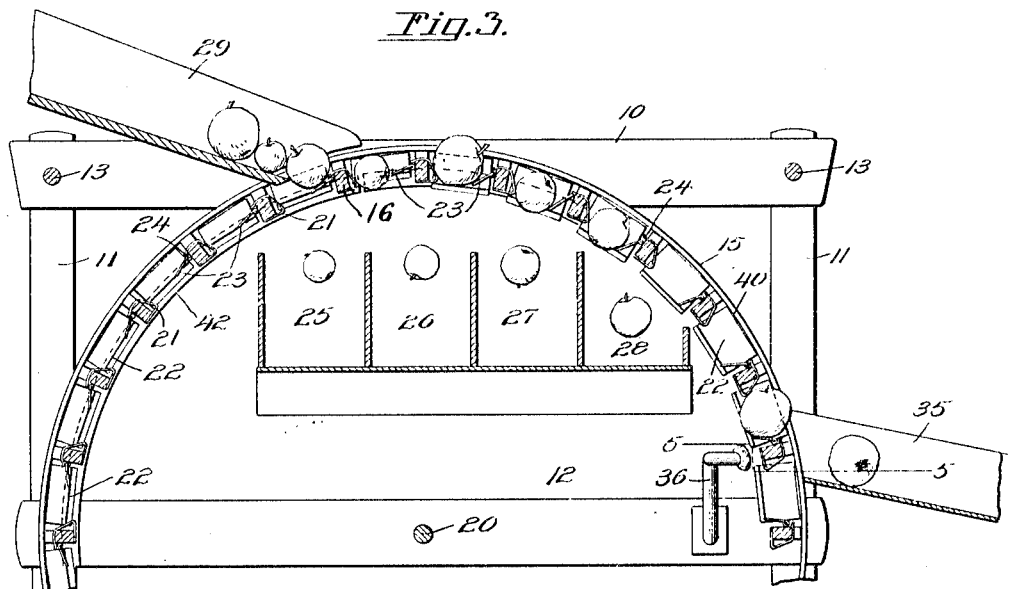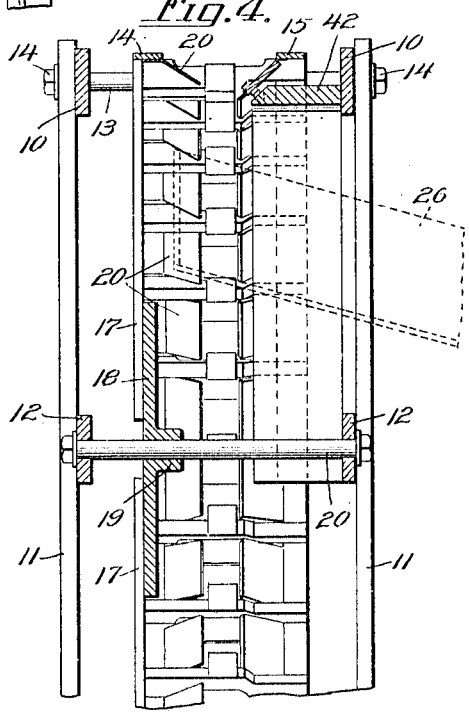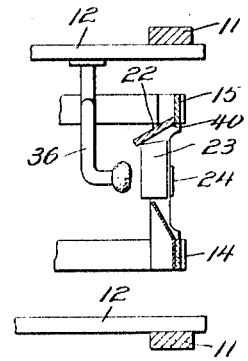

J. A. WOODS.
FRUIT GRADER.
APPLICATION FILED FEB. 19, 1913.

1,118,834.

Patented Nov. 24, 1914.
4 SHEETS—SHEET 3.

Inventor
James A. Woods.

Witnesses

By Victor J. Evans
Attorney

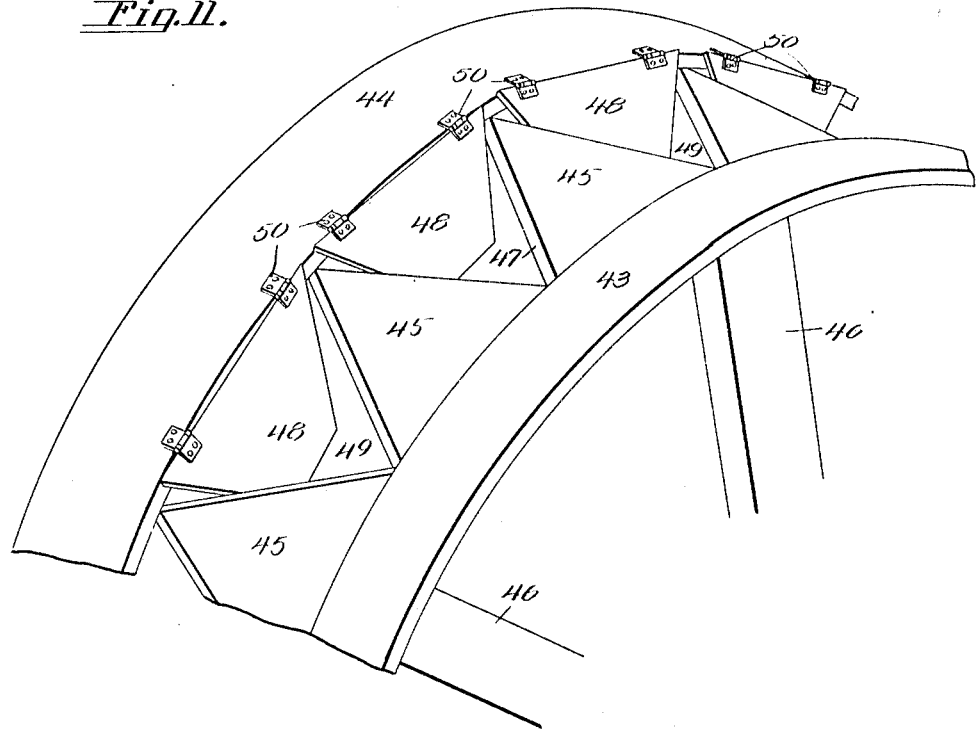

UNITED STATES PATENT OFFICE.

JAMES A. WOODS, OF OGDEN, UTAH, ASSIGNOR TO WOODS AUTOMATIC FRUIT GRADING MACHINE COMPANY, OF OGDEN, UTAH, A CORPORATION OF UTAH.

FRUIT-GRADER.

1,118,834. Specification of Letters Patent. Patented Nov. 24, 1914.

Application filed February 19, 1913. Serial No. 749,491.

*To all whom it may concern:*

Be it known that I, JAMES A. WOODS, a citizen of the United States, residing at Ogden, in the county of Weber and State of Utah, have invented new and useful Improvements in Fruit-Graders, of which the following is a specification.

The invention relates to fruit or vegetable grading machines, and more particularly to the class of fruit or vegetable assorting apparatus.

The primary object of the invention is the provision of a machine of this type wherein fruit or vegetables fed into the same will be assorted according to the varying sizes thereof, and delivered into the respective chutes therefor for discharging on to a gathering table or other support, thereby obviating the necessity of the hand assorting of the fruits or vegetables.

Another object of the invention is the provision of a machine of this type wherein the assorting rotor is formed with a series of adjustable pockets which will automatically deliver different sizes of fruits and vegetables into chutes for the discharge thereof from the machine after assortment thereof.

A further object of the invention is the provision of a machine of this type wherein fruits or vegetables will be assorted during the continued operation of the machine for the grading of the said fruits or vegetables in a quick and convenient manner.

A still further object of the invention is the provision of a machine of this character wherein the assorting pockets within the rotor are automatically adjusted for the grading of the fruits or vegetables to assort the same during the rotation of the said rotor, thereby obviating the hand assorting of the fruits or vegetables.

A still further object of the invention is the provision of a machine of this character which is simple in construction, thoroughly reliable and efficient in operation, requiring the least possible manual power for the working thereof, and also which may be manufactured at a minimum expense.

With these and other objects in view the invention consists in the construction, combination and arrangement of parts which will be hereinafter more full described, illustrated in the accompanying drawings, and pointed out in the claims hereunto appended.

Figure 1:
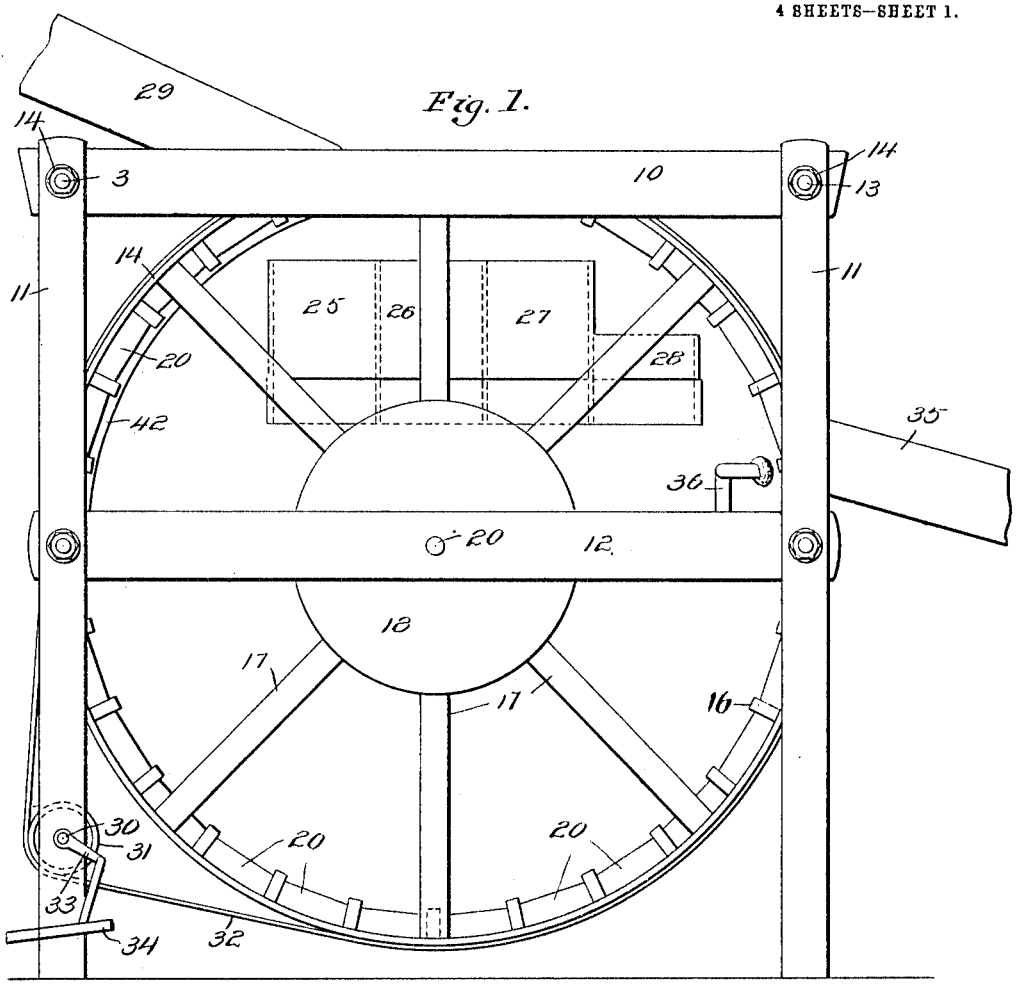
Figure 2:
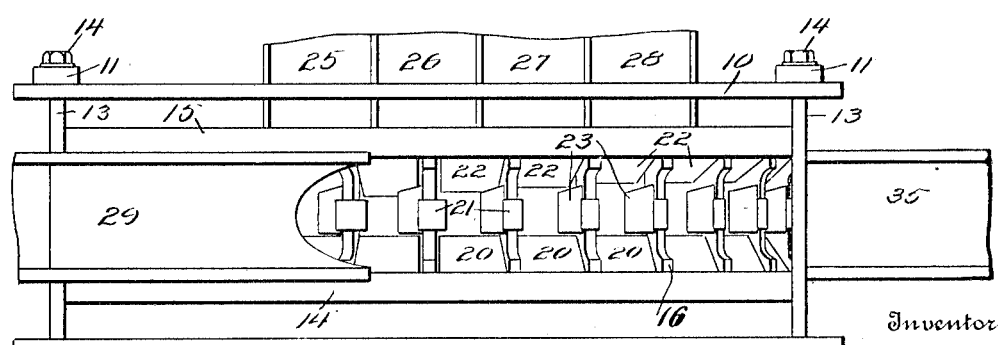
Figure 6:
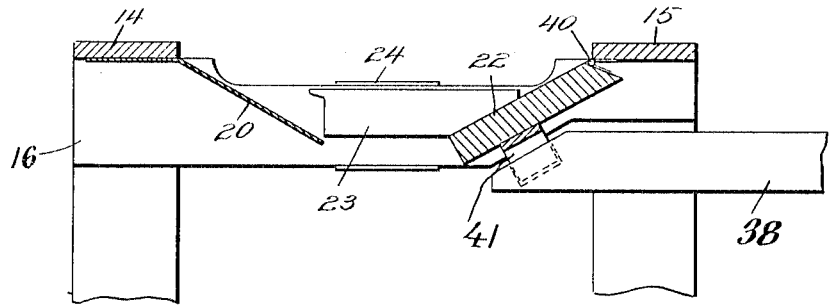
Figure 7:
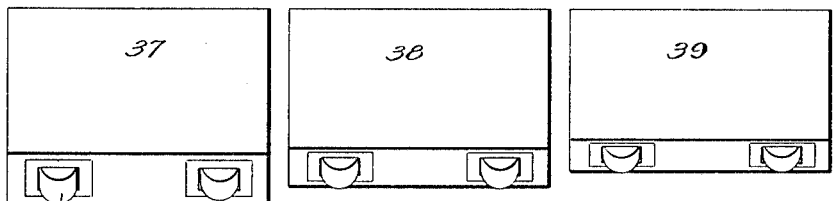
Figure 8:
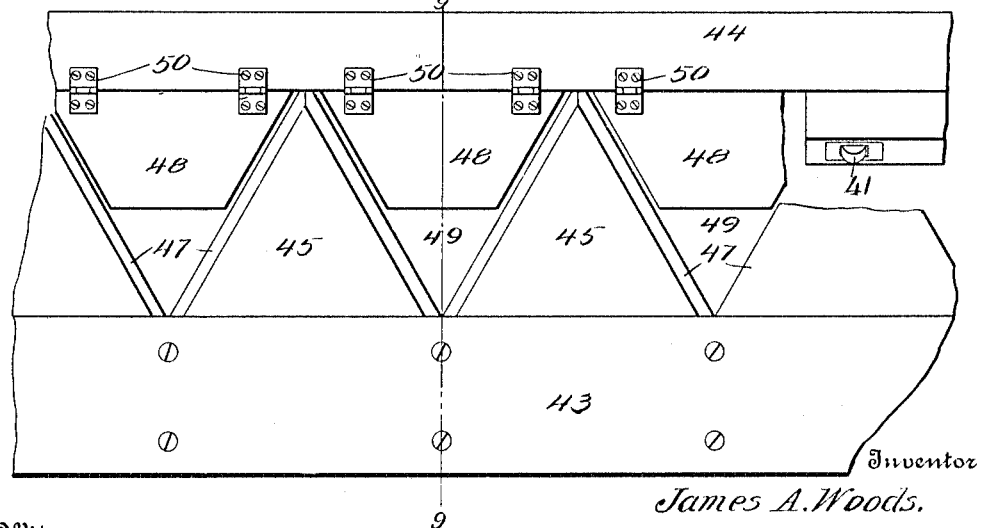

In the drawings:—Figure 1 is a side elevation of a machine constructed in accordance with the invention. Fig. 2 is a top plan view thereof. Fig. 3 is a fragmental vertical longitudinal sectional view of the same. Fig. 4 is a vertical transverse sectional view. Fig. 5 is a sectional view on the line 5—5 of Fig. 3. Fig. 6 is an enlarged fragmentary vertical transverse sectional view through the rotor or wheel. Fig. 7 is a plan view of the series of adjustable grade blocks. Fig. 8 is a fragmentary top plan view of a rotor showing a modified form of pocket therein. Fig. 9 is a sectional view on the line 9—9 of Fig. 8. Fig. 10 is fragmentary vertical longitudinal sectional view through the rotor. Fig. 11 is a fragmentary perspective view thereof.

Similar reference characters indicate corresponding parts throughout the several views in the drawings.

Referring to the drawings by numerals, the machine comprises a supporting frame including spaced horizontally disposed top bars 10, vertical legs 11, and intermediate braces 12, the top bars 10 and braces 12 being fastened to the legs 11 in any desirable manner, although in this instance the same are shown connected by means of cross bolts 13 carrying the usual nuts 14, and arranged within this frame is an assorting rotor presently described.

The rotor comprises spaced annular rims 14 and 15 respectively, which have connected thereto at intervals cross bars 16, the rim 14 being secured to the outer ends of radially extending spokes 17 which are fastened at their inner ends to a central disk 18 provided with a suitable hub 19 which is journaled upon a stud axle 20 mounted in the braces 12 at a medial point thereof. Arranged upon the rotor at the perimeter thereof between the rims 14 and 15 are a series of adjustable pockets, each including stationary side and end wings 20 and 21, respectively, and adjustable side and end wings 22 and 23, respectively, the stationary wings 20 and 21 being arranged in inwardly converging relation to each other, and likewise the adjustable wings 22 and 23 are adapted to lie in inwardly converging planes with respect to each other so that the space between the said wings will accommodate a fruit or vegetable when delivered thereinto. By reason of the adjustability of the wings 22 and 23 the extent of the openings between all of the wings forming each pocket can be varied so as to properly assort varying sizes of fruits or vegetables carried by the rotor into delivery chutes presently described. Each adjustable side wing 22 is designed to abut against the free edge of the adjustable end wing 23 so as to limit the outward swinging movement of the said wing 22, while the outward swinging movement of the wing 23 is limited by means of a stop extension 24 formed on each cross bar 16 of the rotor, the inward swinging movement of the side plates 22 and the adjustability thereof being controlled in a manner presently described.

Arranged slightly above the axis of the rotor are a series of delivery chutes 25, 26, 27 and 28, respectively, the inner ends of which extend beneath the pockets throughout a greater portion of the uppermost portion of the rotor, while the outer ends are projected laterally from one side of the frame exteriorly thereof for communication with a gathering table or other support, and these chutes are adapted to receive the fruit or vegetables from the pockets of the rotor, which are adapted to assort the same for the delivery of different sizes of fruits into their respective chutes.

Mounted upon the frame at the top thereof is a feed trough 29 which is downwardly inclined so as to gravitate the fruits or vegetables placed therein for distributing the same into the pockets at the perimeter of the rotor during the rotation thereof for the assortment of the said fruits or vegetables into respective chutes during the continued operation of the machine, the sides of the said trough being disposed in upwardly diverging relation to each other so as to properly line up the vegetables or fruits to assure the delivery of the same singly to the rotor and prevent the bunching thereof in the pockets of the rotor.

Mounted in a pair of the legs 11 of the frame near the lower ends thereof is a driving shaft 30 to which is fixed a belt pulley 31 having trained thereover an endless belt 32 which is also trained over one of the rims 14 or 15 of the rotor so that when the shaft 30 is rotated similar movement will be imparted to the said rotor, the shaft 30 being provided with a crank 33 to which is suitably connected a foot treadle 34 whereby when foot power is applied to the treadle the machine can be operated.

Mounted in the frame at one end thereof and at a suitable point below the top of the said frame is a delivery chute 35 which communicates with the pockets in the perimeter of the rotor for receiving fruits or vegetables of a larger size than those delivered to the respective chutes 25, 26, 27 and 28, the larger sizes of fruits or vegetables being ejected from the pockets in the rotor through the medium of an ejecting arm 36 stationarily mounted upon one of the braces 12 in the path of movement of the adjustable side wings 22 so that the latter will be moved in a direction to throw the said fruits or vegetables from the respective pockets at the point of communication thereof with the chute 35 during the rotation of the rotor or the continued operation of the machine.

Suitably mounted for adjustment in one of the top bars 10 of the frame are a series of grade blocks 37, 38 and 39 which are arranged to project into the path of the side wings 22 which are connected to the rim 15 by means of hinges 40 so as to automatically adjust the said wings for increasing or decreasing the size of the openings in the pockets during the travel of the rotor, the grade blocks being adjusted in step by step relation to each other as shown in Fig. 7 of the drawing, so that the openings in the pockets at the uppermost portion of the wheel will gradually increase while the rotor is traveling by engaging the respective grade blocks, thereby permitting the discharge of the different size fruits received from the feed trough 29 through the pockets into the respective chutes 25, 26, 27 and 28 during the continued operation of the machine.

Each grade block has mounted therein friction rollers 41 adapted to contact with the side wings 22 so as to minimize friction during the automatic adjustment thereof when the rotor is in action.

In the rotation of the rotor the adjustable side and end wings 22 and 23 will move inwardly throughout the series of the pockets at the upper half of the rotor and to limit the swinging movement of the said series of wings there is provided a track 42, while the side and end wings 22 and 23 of the series of pockets at the lower half of the rotor will swing outwardly and the limit of such movements is controlled through the stops 24, it being seen that the adjustable end wing 23 of each pocket will engage said stop 24 and by reason of the disposition of the side wing 22 in the pocket it will fall against the side wing 23 throughout the arc of movement at the lower half of the rotor, and in this manner the extent of the openings in the pockets is regulated, the track 42 being designed to hold the adjustable side wings 22 at a proper angle throughout the arc of movement at the upper half of the rotor for the engagement of the said side wings 22 with the grade blocks 37, 38 and 39 while the rotor is in action.

In the operation of the machine the fruits or vegetables to be assorted are placed within the feed trough 29 and such fruits or vegetables are successively fed in single file into the pockets in the rotor, which is operated from the foot treadle 34, and while this rotor is in action the openings in the pockets at the uppermost portion of the wheel are varied by the action of the grade blocks 37, 38 and 39 acting upon the side wings 22 of the pockets, so that the fruits or vegetables contained in the pockets will be delivered therethrough according to the extent of the openings therein into the troughs 25, 26, 27 and 28, whence the assorted fruits or vegetables will be delivered onto a gathering table or other support, the larger fruits or vegetables being carried by the rotor beyond the series of chutes heretofore mentioned and are delivered into the chute 35 in a manner hereinbefore described. It is to be understood that the lower end of the trough 29 extends slightly below the uppermost end of the rotor so that the discharge end of the said trough will terminate contiguous to the path of movement of the cross bar 16 of said rotor whereby the fruit or vegetable leaving the trough and entering the pocket in the rotor will be acted upon by said cross bar 16, causing it to roll toward the trough and thereby holding the succeeding vegetables or fruits in the trough back from the rotor until the next pocket therein is brought into communication with the trough, and in this manner the vegetables or fruits are successively delivered singly to the rotor for assortment.

In Figs. 8 to 11 inclusive there is shown a modified form of rotor which comprises spaced annular rims 43 and 44 respectively, which have connected thereto at intervals triangular shaped cross pieces 45, the rim 43 being fixed to the outer ends of the spokes 46 in any suitable manner, and upon these triangular shaped pieces 45 are secured facing plates 47, while supported by the rim 44 are swinging wings 48, the same being designed to move in the spaces 49 between the facing plates 47 so as to increase or decrease the size of each space 49 which is designed to serve as a pocket for receiving a vegetable or fruit, each wing 48 being connected to the rim 44 by means of hinges 50 to permit swinging movement, and each of the said wings 48 is operated upon by the grade blocks 37, 38 and 39 which are arranged to project in the path of the said wings 48 and are mounted in the machine as hereinbefore described. The vegetables or fruits are delivered into the pockets 49 in the perimeter of the rotor from the feed trough 29 in a like manner for delivering the vegetables or fruits from the said trough to the rotor hereinbefore described. Each wing 48 is formed with a finger 51 which limits the inward and upward swinging thereof, while the grade blocks limit the downward and outward swinging movement of each of the said wings 48 for increasing the size of the pockets 49 in the perimeter of the rotor.

From the foregoing it is thought that the construction and manner of operation of the device will be clearly understood, and therefore a more extended explanation has been omitted.

What is claimed is:—

1. A machine of the class described comprising a frame, a rotor journaled therein, a series of automatically adjustable receiving and discharge pockets arranged at the perimeter of the rotor, adjustable means for varying the discharge openings in the pockets, a series of chutes arranged above the axis of the rotor for receiving the assorted articles discharged from the uppermost pockets of the rotor, a feed chute mounted in the frame and adapted for communication with the pockets at the uppermost point of the rotor, means for actuating the rotor, and a trip means arranged in the path of the pockets at one side of the series of chutes for discharging articles within the pockets and rotor after passing the said series of chutes.

2. A machine of the class described comprising a frame, a rotor journaled therein, a series of automatically adjustable receiving and discharge pockets arranged at the perimeter of the rotor, adjustable means for varying the discharge openings in the pockets, a series of chutes arranged above the axis of the rotor for receiving the assorted articles discharged from the uppermost pockets of the rotor, a feed chute mounted in the frame and adapted for communication with the pockets at the uppermost point of the rotor, means for actuating the rotor, a trip means arranged in the path of the pockets at one side of the series of chutes for discharging articles within the pockets and rotor after passing the said series of chutes, each of said pockets including stationary and adjustable side and end wings, and means for limiting the swinging movement of the adjustable side and end wings.

3. A machine of the class described comprising a frame, a rotor journaled therein and having spaced rims and a series of intermediate pockets each provided with an adjustable side wing swingingly connected to one of the rims, a plurality of adjustable blocks mounted in one side of the frame and projected into the path of the wing to vary the relation thereof with respect to the remaining walls of the pockets to increase or decrease the sizes of the pockets during the travel of the rotor, a series of chutes arranged above the axis of the rotor for receiving assorted articles discharged from the respective pockets in the rotor, a feed chute disposed upon the frame for communication with the pockets at the uppermost point of the rotor, and a driving element frictionally engaging the other rim of the rotor for imparting rotation to the latter.

4. A machine of the class described comprising a frame, a rotor journaled therein and having spaced rims and a series of intermediate pockets each provided with an adjustable side wing swingingly connected to one of the rims, a plurality of adjustable blocks mounted in one side of the frame and projected into the path of the wing to vary the relation thereof with respect to the remaining walls of the pockets to increase or decrease the sizes of the pockets during the travel of the rotor, a series of chutes arranged above the axis of the rotor for receiving assorted articles discharged from the respective pockets in the rotor, a feed chute disposed upon the frame for communication with the pockets at the uppermost point of the rotor, a driving element frictionally engaging the other rim of the rotor for imparting rotation to the latter, a discharge chute projected from the frame at a point slightly above the axis of the rotor, and means supported by the frame and projected contiguous to the path of movement of the pockets in the rotor for ejecting assorted articles therefrom.

In testimony whereof I affix my signature in presence of two witnesses.

JAMES A. WOODS.

Witnesses:
ROBERT A. MOYES,
FRANCIS F. WOODS.

Copies of this patent may be obtained for five cents each, by addressing the "Commissioner of Patents, Washington, D. C."